(12) United States Patent
Lyckegård et al.

(10) Patent No.: US 6,535,547 B1
(45) Date of Patent: *Mar. 18, 2003

(54) RANDOM ACCESS IN A MOBILE TELECOMMUNICATIONS SYSTEM

(75) Inventors: Bo Lyckegård, Torslanda (SE); Riaz Esmailzadeh, Yokohama (JP); Johan Nyström, Stockholm (SE); Erik Dahlman, Bromma (SE); Sandeep Chennakeshu, Cary, NC (US); Karim Jamal, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/324,372

(22) Filed: Jun. 2, 1999

(51) Int. Cl.$^7$ ................................................ H04L 27/30
(52) U.S. Cl. .................. 375/145; 375/146; 375/149; 375/364; 375/366; 375/367; 370/322; 370/348; 370/349; 370/437; 370/443; 370/471
(58) Field of Search ................. 375/130, 140, 375/141, 145, 146, 149, 364, 366, 367; 370/320, 322, 327, 330, 335–337, 341–345, 347–349, 432–436, 437, 441–443, 471, 524

(56) References Cited

U.S. PATENT DOCUMENTS 5,414,728 A * 5/1995 Zehavi ........................ 370/206
5,673,260 A * 9/1997 Umeda et al. ............... 370/342
5,790,588 A * 8/1998 Fukawa et al. .............. 370/342
5,822,359 A * 10/1998 Bruckert et al. ............. 370/209
6,141,373 A * 10/2000 Scott ........................... 375/142
6,154,454 A * 11/2000 Abe ............................ 370/335
6,163,533 A * 12/2000 Esmailzadeh et al. ....... 370/342
6,381,229 B1 * 4/2002 Narvinger et al. .......... 370/328

FOREIGN PATENT DOCUMENTS

| WO | WO 98/49857 | 11/1998 |
| WO | WO 99/21375 | 4/1999 |
| WO | 103252 | 2/2000 |

* cited by examiner

Primary Examiner—Stephen Chin
Assistant Examiner—Dac V. Ha
(74) Attorney, Agent, or Firm—Jenkens & Gilchrist, PC

(57) ABSTRACT

A method for improving the performance of a random access communications system in a variable radio environment is disclosed, whereby at least one valid set of burst signatures is used for transmission by one or more mobile stations. Each set includes at least one signature with a different signature-length than the signatures in other sets. The different signature-lengths can be optimized for the operational environments involved (e.g., longer signatures for slower-moving mobile stations, and shorter signatures for high-speed mobile stations). Alternatively, at least one differentially-encoded signature is used for random access transmissions, in order to reduce the radio channel's sensitivity to large doppler spreads and frequency errors.

25 Claims, 1 Drawing Sheet

RANDOM ACCESS IN A MOBILE TELECOMMUNICATIONS SYSTEM

CROSS-REFERENCES TO RELATED APPLICATIONS

This Application for Patent is related by subject matter to commonly-assigned U.S. patent application Ser. Nos. 08/733,501, 08/847,655, 09/148,224, 09/166,679 and 09/169,731, filed Oct. 18, 1996, Apr. 30, 1997, Sep. 4, 1998, Oct. 5, 1998, and Oct. 9, 1998, respectively, which are hereby incorporated by reference herein in their entirety.

BACKGROUND OF THE INVENTION

1. Technical Field of the Invention

The present invention relates generally to the mobile telecommunications field and, in particular, to a method for processing multiple random access mobile-originated calls in rapidly varying radio channels.

2. Description of Related Art

The next (so-called "third") generation of mobile communications systems will be required to provide a broad selection of telecommunications services including digital voice, video and data in packet and channel circuit-switched modes. As a result, the number of calls being made is expected to increase significantly, which will result in much higher traffic density on random access channels (RACHs). Unfortunately, this higher traffic density will also result in increased collisions and access failures. Consequently, the ability to support faster and more efficient random access is a key requirement in the development of the new generation of mobile communications systems. In other words, the new generation systems will have to use much faster and more flexible random access procedures, in order to increase their access success rates and reduce their access request processing times.

In a Direct Sequence-Code Division Multiple Access (DS-CDMA) mobile communications system, in order for a mobile station to commence radio communications with a base station, radio channel resources are allocated (dedicated) to the connection (for both mobile-originated and mobile-terminated calls). Typically, the mobile station contacts the base station on a RACH, which is a common (shared) channel. As such, requests to set up a dedicated connection are often transmitted on a RACH. Alternatively, short packets of user data can be transmitted on the RACH as well.

In many mobile communications systems, a slotted-ALOHA (S-ALOHA) random access scheme is used. For example, systems operating in accordance with the IS-95 Standard (ANSI J-STD008) use an S-ALOHA random access scheme. Typically, an S-ALOHA random access scheme is employed to enable several MSs to use the same physical channel. For example, using a basic S-ALOHA random access scheme, there are well-defined instants in time (time slots) at which random access transmissions are allowed to begin. A mobile station randomly selects such a time slot for transmission of a random access burst. The mobile station then listens to a downlink common physical channel for an acknowledgment from the base station that the random access burst was received. However, these time slots are not pre-allocated to specific users' mobile stations. Consequently, collisions between the different mobile stations' random access bursts can occur. As such, if one mobile station's RACH burst collides with another mobile station's RACH burst, this collision problem is resolved by having the mobile stations re-transmit their RACH messages in a respective allowed time slot (after a random waiting time). However, if the traffic load is relatively high, this collision resolution approach can be inadequate and collisions can still occur.

A number of other random access collision resolution approaches have been proposed. For example, in a specific mobile communications system using an S-ALOHA random access scheme, such as the method disclosed in the above-cited U.S. patent application Ser. No. 08/733,501 (hereinafter, "the '501 Application"), a mobile station generates and transmits a random access packet. A diagram that illustrates a frame structure for such a random access packet is shown in FIG. 1. The random access packet ("access request data frame") or "burst" comprises a preamble (10) and a data or message part (12). Typically, the preamble does not include user information and is used in the base station receiver primarily to facilitate detection of the presence of the random access burst and derive certain timing information (e.g., different transmission path delays). Note that, as illustrated in FIG. 1, there can be an idle period (14) between the preamble and message part during which time there is no transmission.

In order to reduce the risk of collisions between the random access bursts of two mobile stations that have selected the same time slot, the concept of burst "signatures" has been introduced. For example, as described in the '501 Application (see FIG. 2), the preamble of a random access burst is modulated with a unique signature pattern. Also, the message part is spread with a code associated with the signature pattern used. The signature pattern is randomly selected from a set (e.g., one or more) of patterns that can be, but are not necessarily, orthogonal to each other. Since a collision can occur only between mobile stations' bursts that are using the same signature, the risk of a random access collision is reduced in comparison with other existing schemes. As such, the use of this unique signature pattern feature, as described and claimed in the '501 Application, provides a significantly higher throughput efficiency than prior random access schemes.

The above-cited U.S. patent application Ser. No. 09/169,731 (hereinafter, "the '731 Application") describes and claims a novel format for an uplink common physical channel in a random access mobile communications system, in which a mobile station transmits a predetermined signature pattern in parallel with the message or data part of the random access request. Consequently, the signature portion of the random access request can also function as a pilot by providing additional energy for channel estimation during the data part of the request, while advantageously reducing the amount of overhead signalling involved. This additional energy is especially useful in attempting to ensure sufficiently high quality coherent detection of the data portion in a rapidly varying radio channel environment.

Nevertheless, ideally in a rapidly varying radio channel, the energy used for channel estimation should be spread out in time over the data or message part, in order to achieve a radio channel estimate of sufficient quality during that portion of the random access request. Even if a channel estimate of sufficient quality can be achieved during the preamble (due to the distinctive signature in the preamble), in a rapidly varying channel, this estimate might not be valid for a significant part of the data portion of the random access request. As such, it is important to provide enough energy in the preamble for the receiver to detect the preamble and correctly identify the channel paths.

On the other hand, in a rapidly varying radio channel, it is also important to provide enough energy in the pilot to ensure proper coherent detection of the data portion. Unfortunately, these two important but conflicting energy requirements in an uplink common physical channel format result in the transmission of random access requests with excessive overhead signalling. In other words, the ratio of "overhead" energy (preamble+pilot energy) to the "data" energy is unnecessarily high, with its attendant disadvantages.

Notably, although the above-described random access methods and solutions have numerous advantages over prior random access schemes, a number of problems still exist that remain to be solved. For example, regardless of whether or not a signature pattern is transmitted in a preamble or in parallel with a preamble, it can be assumed that the transmitted signature pattern will be detected at a base transceiver station using coherent correlation detection techniques. However, in that regard, because of the doppler spread of the radio channel used (due to the mobile station's motion) as well as the various frequency errors that can exist between the mobile station and base station, the radio channel can vary so rapidly during the signature's duration that coherent correlation cannot be accomplished at the base station's receiver. This problem is particularly pronounced for the higher carrier frequencies, because the maximum doppler spread of a radio channel is proportional to the carrier frequency being used. Nevertheless, as described in detail below, the present invention successfully resolves these and other related problems.

SUMMARY OF THE INVENTION

In accordance with a preferred embodiment of the present invention, a method for improving the performance of a random access communications system in a variable radio environment is provided whereby at least one valid set of burst signatures is used for transmission by one or more mobile stations. Each set includes at least one signature with a different signature-length than the signatures in other sets. The different signature-lengths can be optimized for the operational environments involved. For example, a set of relatively long signatures can be used for slower-moving mobile stations, such as in an indoor cell. A set of relatively short signatures can be used for high-speed mobile stations, such as in cells covering a highway. Depending on the operational environment, the signature-lengths in the other sets can be somewhere in between the lengths of the short and long sets. Also, in accordance with a second embodiment of the present invention, at least one differentially-encoded signature is used for random access transmissions, in order to reduce the radio channel's sensitivity to large doppler spreads and frequency errors.

An important technical advantage of the present invention is that the random access approach used will be less sensitive to fast-fading and frequency errors than prior random access approaches.

Another important technical advantage of the present invention is that the performance of the random access approach used will be significantly higher than prior random access approaches.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–4 of the drawings, like numerals being used for like and corresponding parts of the various drawings.

Essentially, in accordance with a preferred embodiment of the present invention, a method for improving the performance of a random access communications system in a variable radio environment is provided, whereby at least one valid set of burst signatures is used for transmission by one or more mobile stations. Each set includes at least one signature with a different signature-length than the signatures in other sets. The different signature-lengths can be optimized for the operational environments involved. For example, a set of relatively long signatures can be used for slower-moving mobile stations, such as in an indoor cell. A set of relatively short signatures can be used for high-speed mobile stations, such as in cells covering a highway. Depending on the operational environment, the signature-lengths in the other sets can be somewhere in between the lengths of the short and long sets. Also, in accordance with a second embodiment of the present invention, at least one differentially-encoded signature is used for random access transmissions, in order to reduce the radio channel's sensitivity to large doppler spreads and frequency errors.

Figure 1:
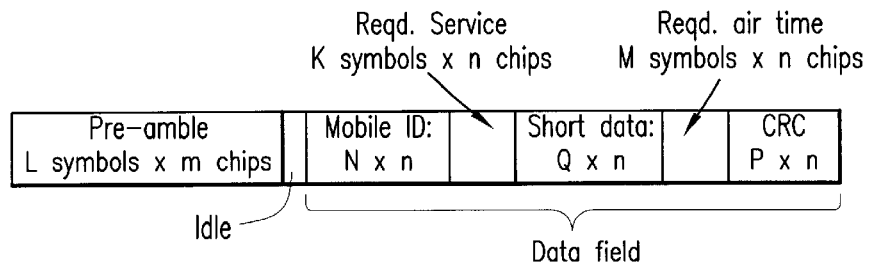
FIG. 1 is a diagram that illustrates a frame structure for a random access packet.
Figure 2:
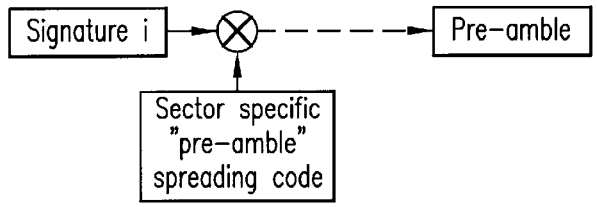
FIG. 2 is a diagram that shows the preamble of a random access burst modulated with a unique signature pattern.
Figure 3:
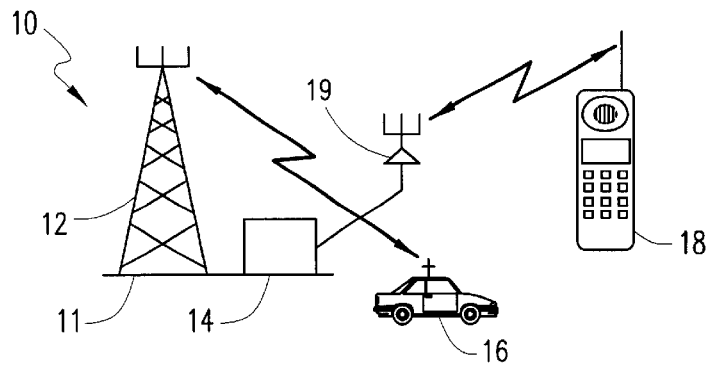
FIG. 3 is a pertinent section of a cellular communications system, which can be used to implement the present invention.

Specifically, referring to FIG. 3, a pertinent section of a cellular communications system 10 is shown, which can be used to implement the present invention. System 10 includes a base station 11 with a transmit/receive antenna 12 and transmitter/receiver section 14, and a plurality of mobile stations 16 and 18. For the preferred embodiment, the mobile station 16 is assumed to be a high-speed mobile station connected via a radio link to, for example, a macrocell defined by base station 11 to cover part of a highway. The mobile station 18 is assumed to be a relatively slow-moving mobile station connected via a radio link to, for example, a pico-cell defined by a transmitter/receiver unit 19 to cover an inside part of a building. Although only two mobile stations are shown, FIG. 3 is for illustrative purposes only, and the present invention can be assumed to include more than two mobile stations.

Prior to generating and transmitting an access request frame, a mobile station (e.g., 16) acquires synchronization, or synchronizes, with a target base station receiver (14). The mobile station then determines the starting time for each slot from the base station's broadcast/pilot channel information. The mobile station also retrieves the number of the slot being processed from the broadcast/pilot channel information, which is to be used by the base station to tag its acknowledgment (ACK) message reply with the slot number to ensure that the correct mobile receives the acknowledgment. More details for synchronizing a mobile station to a base station can be found in the '501 Application.

The target base station (11) also transfers to the requesting mobile station(s) (e.g., over the downlink broadcast channel) each of the unique random access spreading codes and long-codes associated with each of the sectors and/or cells defined by the base station transceiver (e.g., 14 or 19) involved. For example, these unique spreading codes and long-codes can be Gold codes or Kasami codes. The mobile station stores the spreading code and long-code information in a memory storage area (not shown), which is to be retrieved and used by the mobile station to spread the preamble and data field of the random access request packets generated. Finally, in accordance with the preferred embodiment of the present invention, the base station can also transfer to the requesting mobile station(s) (e.g., in an appropriate broadcast message on a common broadcast channel in each cell or group of cells) the valid sets of signatures associated with the preambles, which can be used to distinguish between the different sectors and/or cells. Alternatively, the requesting mobile station can maintain (e.g., in local memory) a plurality of signature sets with a different signature-length in each set. In other words, each signature-length maintained corresponds to a set of signatures having that length. The mobile station selects a valid signature-length to use for a random access request transmission. For this embodiment, the signature-length selection is based on, for example, a direct or indirect estimate of the doppler spread and/or radio channel variations. These estimates can be based on signal strength measurements made directly by the mobile station, or indirectly from measurement or channel variation information that the mobile station has received from the base station.

At least one signature having the same signature-length is included in the signature set selected for transmission by the mobile station. The requesting mobile station then selects (randomly or specifically) one of the signatures in the set for transmission in a random access request. As such, detailed descriptions of methods and systems for a mobile station to transmit a signature in a random access request, and for a base station receiver to detect such random access requests are provided in the above-cited '501 and '731 Applications.

Figure 4:
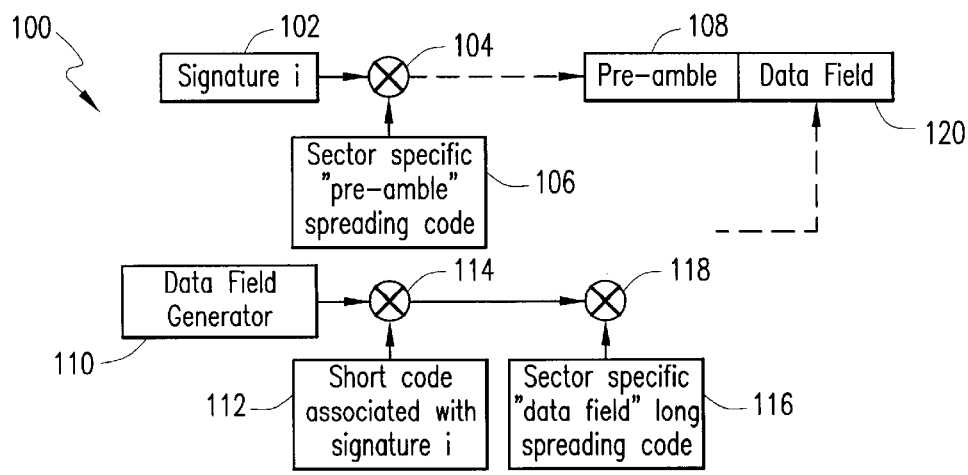
FIG. 4 is a block diagram of an apparatus that can be used by a mobile station to generate and transmit a random access packet with a signature having a predetermined signature-length, in accordance with a preferred embodiment of the present invention.

For example, FIG. 4 is a block diagram of an apparatus that can be used by a mobile station (e.g., 16, 18) to generate and transmit a random access packet with a signature having a predetermined signature-length, in accordance with a preferred embodiment of the present invention. For this embodiment, the present method can be implemented under the control of a microprocessor (not shown) located in the mobile station. An exemplary random access generating unit 100 includes a signal mixer 104, which spreads a signature "i" 102 (e.g., retrieved from an internal memory area in the mobile station) with a specific preamble spreading code for the cell-sector involved (e.g., also retrieved from the internal memory area) to form a cell-sector specific preamble of the random access packet to be transmitted. Notably, in accordance with the preferred embodiment, the signature "i" can be from a set of signatures having a relatively short signature-length, for example, for a high-speed mobile station 16 (e.g., rapidly-varying radio channel environment), or a relatively long signature-length, for example, for a slow-moving mobile station 18 (e.g., not rapidly-varying radio channel environment). In any event, the specific signature-length selected depends on the actual radio channel environment and system design constraints imposed, and this selection is not intended to be limited unnecessarily to any specific signature-length.

The data field of the random access packet to be transmitted can be generated with a data field generator 110. A mixer 114 spreads the generated data field with a unique short spreading code (112) associated with the signature "i". The resulting data field of the random access packet is then spread with a concatenated code, which can be constructed, for example, by a modulo-2 addition (by mixer 118) of the signature-associated short code (112) with a sector-specific long spreading code 116 (e.g., retrieved from an internal memory area). The length of the resulting data field (120) of the random access packet to be transmitted can be flexibly selected at the mobile station. Alternatively, as described in the '731 Application, the random access packet to be transmitted can also comprise a signal format wherein a selected signature (having a predetermined signature-length in accordance with the present invention) is transmitted in parallel with the data field.

In accordance with a second embodiment of the present invention, a mobile station (16, 18) can transmit at least one of a plurality of differentially-encoded signatures with a random access request. In other words, instead of transmitting a signature for use in coherent detection at the base station involved, a mobile station can transmit a differentially-encoded signature with a random access request. The signatures to be used can be distinguished from each other, for example, by the phase differences between the consecutive differentially-encoded symbols that comprise the signatures.

For this exemplary embodiment, it is preferable that the differentially-encoded signatures used for the random access requests have relatively good auto-correlation and cross-correlation properties. In particular, it is preferable that these signatures used be orthogonal to each other at the output of the receiver's differential decoder in the base station involved. For example, the following binary signatures of length 4 (note that the use of binary numbers and specific lengths is arbitrary but useful for illustrative purposes) can be used in the set $C=(c_1,c_2,c_3,c_4)$:

$c_1=(+1, +1, +1, +1)$
$c_2=(+1, -1, +1, -1)$
$c_3=(+1, +1, -1, -1)$
$c_4=(+1, -1, -1, -1)$

The signatures, $c_1$–$c_4$, in this set are coherently orthogonal to one another. In other words, it is clear that $c_i*c_j^T=0$, except for i=j. As such, a differentially orthogonal set (D) of four signatures of length 5, which are based on the set C, can be derived as follows.

The first symbol of each signature, $d_i$, of the set D is made equal to "+1" to provide a coherent phase reference. A requirement is then imposed that $d_i(k)*d_i(k+1)=c_i(k)$, for k=1, . . . , 4 and i=1, . . . , 4, which results in a signature set $D=(d_1,d_2,d_3,d_4)$:

$d_1=(+1, +1, +1, +1, +1)$
$d_2=(+1, +1, -1, -1, +1)$
$d_3=(+1, +1, +1, -1, +1)$
$d_4=(+1, +1, -1, +1, +1)$

As such, the signatures of the set D will be orthogonal after they are differentially decoded. In other words, if the following differentially decoded signature is formed (e.g., at the output of a differential decoder at the base station receiver):

$$g_i=(d_i(2)*d_i(1),d_i(3)*d_i(2),d_i(4)*d_i(3),d_i(5)*d_i(4))$$

where i=1, . . . , 4, then $g_m*g_n^T=0$, except for m=n. In summary, in accordance with a second embodiment of the present invention, a signature, $c_i$, from the set C can be transmitted by a mobile station with a random access request. The corresponding signature, $d_i$, can then be differentially decoded for channel estimation at the base station receiver, in order to reduce the random access system's sensitivity to high doppler spreads and large frequency errors. However, in addition to the differential orthogonality properties advantageously demonstrated by the above-described differential signature set, D, it is advantageous for the signature set D also to have relatively good differential cross-correlation properties at phase shifts other than zero. Furthermore, by using a coherent phase reference for the first symbol in each signature used, the receiving base station can use the signature to perform a channel estimation to further improve the performance of the RACH.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for generating a random access packet in a mobile communications system, comprising the steps of:
    selecting a signature length associated with a performance characteristic of a radio channel to be used for conveying said random access packet, wherein said performance characteristic of said radio channel is based on an estimate of a rate of variation of said radio channel;
    selecting a signature from a plurality of signatures, a length of said signature equal to said selected signature length; and
    combining said signature with a spreading code, said spreading code associated with a predetermined cell sector.

2. The method of claim 1, further comprising the steps of:
    generating a data field;
    spreading said data field with a short code associated with said signature; and
    further spreading said spread data field with a long spreading code associated with said predetermined cell sector.

3. The method of claim 2, further comprising the steps of:
    combining said spread signature with said further spread data field to form said random access packet; and
    transmitting said random access packet.

4. The method of claim 2, further comprising the steps of:
    transmitting said spread signature in parallel with said further spread data field.

5. The method of claim 1, wherein said radio channel comprises a direct sequence-code division multiple access physical channel.

6. The method of claim 5, wherein said direct sequence-code division multiple access physical channel comprises an uplink common physical channel.

7. The method of claim 1, wherein said plurality of signatures comprises at least one coherent signature.

8. The method of claim 1, wherein each of said plurality of signatures is orthogonal to the other signatures.

9. The method of claim 1, wherein the step of selecting a signature length comprises the steps of:
    a base station selecting said signature length associated with said performance characteristic of said radio channel to be used for conveying said random access packet; and
    conveying said selected signature length to a mobile station over a broadcast channel.

10. A method for generating a random access packet in a mobile communications system, comprising the steps of:
    selecting a signature from a plurality of differentially-encoded signatures;
    combining said selected differentially-encoded signature with a spreading code, said spreading code associated with a predetermined sector;
    generating a data field;
    spreading said data field with a short code associated with said selected differentially-encoded signature; and
    further spreading said spread data field with a long spreading code associated with said predetermined sector.

11. The method of claim 10, further comprising the steps of:
    combining said spread differentially-encoded signature with said further spread data field to form said random access packet; and
    transmitting said random access packet.

12. The method of claim 10, further comprising the steps of:
    transmitting said spread differentially-encoded signature in parallel with said further spread data field.

13. The method of claim 10, wherein a first symbol of said differentially-encoded signature has a predetermined value.

14. The method of claim 13, wherein said predetermined value is +1.

15. An apparatus for use in generating a random access packet in a mobile communications system, comprising:
    means for selecting a signature length associated with a performance characteristic of a radio channel to be used for conveying said random access packet, wherein said performance characteristic of said radio channel is based on an estimate of a rate of variation of said radio channel;

means for selecting a signature from a plurality of signatures, a length of said signature equal to said selected signature length; and means for combining said signature with a spreading code, said spreading code associated with a predetermined cell sector.

16. The apparatus of claim 15, wherein said radio channel comprises a direct sequence-code division multiple access physical channel.

17. The apparatus of claim 16, wherein said direct sequence-code division multiple access physical channel comprises an uplink common physical channel.

18. The apparatus of claim 15, wherein said plurality of signatures comprises at least one coherent signature.

19. The apparatus of claim 15, wherein each of said plurality of signatures is orthogonal to the other signatures.

20. The apparatus of claim 15, further comprising:

a base station, said base station including said means for selecting said signature length associated with said performance characteristic of said radio channel to be used for conveying said random access packet, and means for conveying said selected signature length to a mobile station over a broadcast channel.

21. An apparatus for use in generating a random access packet in a mobile communications system, comprising:

means for selecting a signature from a plurality of differentially-encoded signatures;

means for combining said selected differentially-encoded signature with a spreading code, said spreading code associated with a predetermined sector;

means for generating a data field;

means for spreading said data field with a short code associated with said selected differentially-encoded signature; and means for further spreading said spread data field with a long spreading code associated with said predetermined sector.

22. The apparatus of claim 21, further comprising:

means for combining said spread differentially-encoded signature with said further spread data field to form said random access packet; and means for transmitting said random access packet.

23. The apparatus of claim 21, further comprising:

means for transmitting said spread differentially-encoded signature in parallel with said further spread data field.

24. The apparatus of claim 21, wherein a first symbol of said differentially-encoded signature has a predetermined value.

25. The apparatus of claim 24, wherein said predetermined value is +1.

* * * * *

UNITED STATES PATENT AND TRADEMARK OFFICE
CERTIFICATE OF CORRECTION

PATENT NO.     : 6,535,547 B1
DATED          : March 18, 2003
INVENTOR(S)    : Bo Lyckegård et al.

It is certified that error appears in the above-identified patent and that said Letters Patent is hereby corrected as shown below:

Title page,
Item [56], FOREIGN PATENT DOUCMENTS, replace "WO 103252 2/2000" with -- Standard Search Report for RS 103252 US completed on 02/16/2000 --

Column 5,
Line 54, replace "received-from" with -- received from --

Column 7,
Line 4, replace "$c_4= (+1, -1, -1, -1)$" with -- $c_4= (+1, -1, -1, +1)$ --

Signed and Sealed this

Twenty-third Day of September, 2003

JAMES E. ROGAN
*Director of the United States Patent and Trademark Office*